United States Patent [19]
Cromwell et al.

[11] 4,176,434
[45] Dec. 4, 1979

[54] METHOD OF MAKING PISTON RINGS WITH CHROME-FILLED GROOVES

[75] Inventors: John E. Cromwell; Nicholas Herbert, both of Baltimore; Glenn F. Hyde, Timonium, all of Md.

[73] Assignee: Koppers Company, Inc., Pittsburgh, Pa.

[21] Appl. No.: 907,375

[22] Filed: May 19, 1978

Related U.S. Application Data

[63] Continuation of Ser. No. 760,637, Jan. 19, 1977, abandoned, which is a continuation-in-part of Ser. No. 691,501, Jun. 1, 1976, abandoned, which is a continuation-in-part of Ser. No. 480,164, Jun. 19, 1974, abandoned.

[51] Int. Cl.² .............................................. B23P 15/06
[52] U.S. Cl. ................................ 29/156.63; 277/224; 277/235 A; 204/25
[58] Field of Search ...................... 29/156.6, 156.63; 277/235 A, 224, 216; 204/25

[56] References Cited

U.S. PATENT DOCUMENTS

| | | | |
|---|---|---|---|
| 2,565,042 | 8/1951 | Phillips | 277/235 A |
| 2,609,260 | 9/1952 | Marien | 277/235 A |
| 3,421,198 | 1/1969 | Prasse | 29/156.6 |
| 3,435,502 | 4/1969 | Thompson et al. | 29/156.63 |
| 3,595,590 | 7/1971 | Beyer | 277/235 A |
| 3,615,099 | 2/1969 | Prasse | 277/235 A |
| 3,814,447 | 6/1974 | Prasse et al. | 277/224 |

FOREIGN PATENT DOCUMENTS 1057570 2/1967 United Kingdom ............... 277/235 A

*Primary Examiner*—Daniel C. Crane
*Attorney, Agent, or Firm*—Thomas L. Sivak; Oscar B. Brumback

[57] ABSTRACT

A method of making piston rings comprising forming annular stepped grooves in the outer periphery of a plurality of piston ring blanks, stacking the blanks on a rotatable arbor, electro-depositing a layer of chromium in the grooves and on the outer surfacs of the ring blanks, and removing an outer portion of the chromium layer and the outer bearing faces of the ring blanks to form a plurality of piston rings having a continually axially convex surface on the face of the ring formed by the deposited chromium and bearing faces of the ring.

4 Claims, 3 Drawing Figures

METHOD OF MAKING PISTON RINGS WITH CHROME-FILLED GROOVES

CROSS REFERENCES TO RELATED APPLICATIONS

This is a continuation, of application Ser. No. 760,637, filed Jan. 19, 1977, now abandoned, which is a continuation-in-part of co-pending application Ser. No. 691,501 filed on June 1, 1976, now abandoned, by John E. Cromwell et al. and assigned to the assignee of the present invention. Application Ser. No. 691,501 is a continuation-in part of application Ser. No. 480,164 filed June 19, 1974, now abandoned.

BACKGROUND OF THE INVENTION

1. Field of the Invention

This invention relates to a method of making sealing rings having a coating of wear resistant material deposited on the bearing face thereof and more particularly to a method of making a piston ring having a chrome filled stepped groove in its outer bearing face and in which chromium is deposited, and formed into a continually axially convex surface.

2. Description of the Prior Art

Chromium plated piston rings are old and well known, in the art. However, the use of such rings has not been without problems. A major problem is the tendency of the chromium layer to crack from fatigue and cause the ring body to break on fatigue. Various approaches have been taken to eliminate this problem. Generally to prevent the breakage the industry has gone to higher strength base materials. Even in view of the added cost, the substitution has not been entirely successful.

Such rings have been successful in conventional diesel engines. However, the operating conditions imposed by the new high speed and high powered diesel engines have been such as to still cause ring failure, even within the warranty period. In one of these engines, the stresses included on the compression rings caused such a high rate of fatigue failures that continued production of the engine was questionable.

Accordingly, it is an object of the present invention to provide a method of making a chromium plate piston ring which is not subject to failure by reason of the fatigue of the ring and, therefore, is able to withstand the stresses imposed in compression rings by high speed and high powered diesel engines.

SUMMARY OF THE INVENTION

The foregoing and other objects and advantages have generally been achieved by the method of making piston rings comprising annular stepped grooves in the outer periphery of a plurality of piston ring blanks, stacking the blanks on a rotatable arbor, electro-depositing a layer of chromium in the grooves and on the outer periphery of the piston ring blanks, and removing an outer portion of the chromium layer and the outer bearing faces of the piston ring blanks to form a piston ring having a continually axially convex surface by lapping the surface to a crown drop.

The piston ring formed by the method of this present invention includes an annular groove in its outer periphery forming axially-spaced outer bearing faces between the groove and the side faces of the ring with the groove including a bottom land and a pair of axially-spaced radially intermediate lands connected to the bottom land and the outer bearing faces by radially outwardly diverging side walls forming stepped sides for the groove with the groove being filled with a layer of electro-deposited chromium. The chromium deposit and the outer bearing faces between the groove and the side faces form a continuous axially convex surface on the ring.

The above and further objects and novel features of the invention will appear more fully from the following detailed description when read in connection with the accompanying drawings.

BRIEF DESCRIPTION OF THE DRAWINGS

In the drawings wherein like parts are marked alike.

DESCRIPTION OF THE PREFERRED EMBODIMENT

Figure 1:
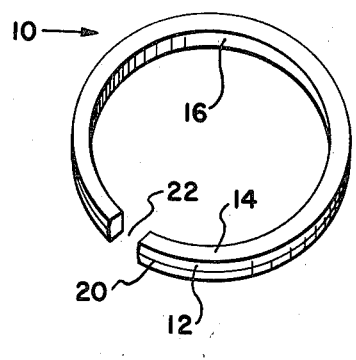
FIG. 1 is a perspective view of a piston ring of the present invention.

The piston ring of the present invention is generally denoted by numeral 10 in FIG. 1. A groove is formed in the outer periphery of ring 10, such ring preferably being circumferentially split at 22. Ring 10 is made of a ferrous metal such as ductile iron or other alloy compatible with the deposition of chromium plate thereon.

Figure 2:
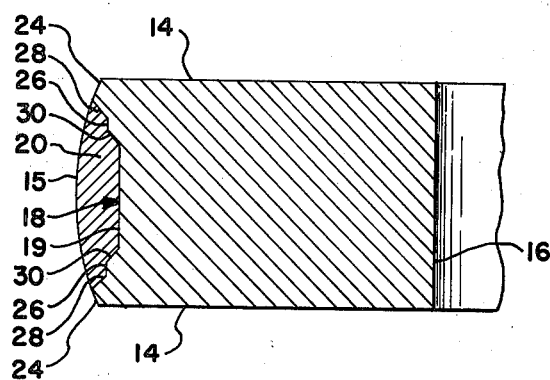
FIG. 2 is an enlarged cross section of the ring of FIG. 1 showing a stepped groove in the outer face of the ring filled with chromium.

More specifically, as shown in FIG. 1, ring 10 has an outer bearing face 12, an inner bore 16, side faces 14, and a groove 18 in the outer bearing face 12. The annular groove 18 in the outer periphery 12 of ring 10 forms axially-spaced outer bearing shoulders 24 between groove 18 and the side faces 14 of the ring. The groove 18 includes a bottom land 19 and a pair of axially-spaced, radially intermediate lands 26 connected to the bottom land 19 and to the outer bearing shoulders 24 by radially outwardly diverging side walls 28 and 30, thereby forming stepped sides for the groove 18. The groove 18 is filled with a layer of electro-deposited chromium 20 extending between the outer bearing shoulders 24. The chromium deposit 20 and outer bearing shoulder 24 form a continuous axially convex surface 15, as shown in FIG. 2.

Preferably, the width of the chromium extending between shoulders 24 is about 75% of the width of surface 12 with the chromium being substantially centered between the side faces 14 of ring 10. In its finished condition, as shown in FIG. 2, the depth of the chromium from the crown 15 to the bottom land 19 is about 0.0065 inches. The diverging side walls 28 and 30 extend at an angle of about 55° with the side walls 14 as shown. The intermediate lands 26 are located about midway between bottom land 19 and outer bearing face 12, the lands 26 being about 0.003 inches from the face 12; the width of lands 26 (parallel to surface 12) is about 0.005 inches.

The foregoing dimensions were developed to achieve the best profile of the chromium 20 on the ring 10 prior to grinding. However, such dimensions may vary within reasonable limits. For example, the width of the chromium may be as much as 90% of the width of the ring; beyond this, the bearing shoulders 24 may not be strong enough to protect the chromium. The depth of the chromium may be as little as 0.003 inches but at a lesser thickness will have insufficient strength. At a depth of more than about 0.009 inches, the fatigue strength of the ring begins to lessen. The 55° angle of divergence from the side walls was chosen to provide the best profile for chrome plating as will be explained. At less than 55°, deeper depressions appear in the plated ring before grinding which requires a greater build-up of chromium; thus the minimum angle should be no less than 30°. On the other hand, at greater than 55°, the chromium tapers so gradually to a knife edge where it meets bearing shoulders 24 that the flaking may occur; thus, the angle of divergence should not exceed about 70°. Similarly, the distance of intermediate lands 26 from surface 12 should not be less than about 0.002 inches to avoid forming too thin a section of chromium between the lands and the finally finished outer surface 12 to avoid flaking. At a distance of more than about 70% of the total groove depth, deeper depressions are formed in the chromium which necessitates a greater chromium build-up before grinding which is to be avoided. Again, to achieve the best chromium profile for grind, the axial width of the intermediate lands 26 should not exceed about 0.010 inch or be less than about 0.003 inch otherwise, the effect of the profile is lost.

Figure 3:
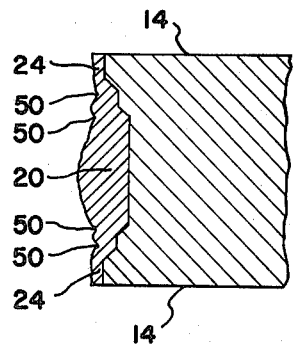
FIG. 3 is a view similar to FIG. 2 showing the build-up of chromium in a stepped groove in a piston ring of the present invention.

Rings 10 are preferably made in the following manner in accordance with this invention. Annular grooves 18 are formed, such as by machining, in the bearing face 12 of a plurality of individual piston ring blanks to form the axially-spaced outer bearing shoulders 24 between the edges of groove 18 and the side faces 14 of each ring, such grooves being formed with a bottom land 19 and axially-spaced intermediate lands 26 connected by the diverging side walls 28 and 30 to form stepped sides for the groove 18 as previously explained. After the ring blanks are thus formed, a plurality of such blanks are stacked on a rotatable arbor, as well known in the art, and the arbor is then placed in a plating tank for electro-depositing a layer of chromium 20 on the outer bearing face 12 of the ring blanks, grooves 18 and the outer bearing shoulders 24 are filled to a depth such as illustrated in FIG. 3, that is, to a depth such that the bottom of depressions 50 are a few thousandths of an inch above the surfaces 24. A chromium thickness of about 0.003-0.004 inches above surfaces 24 is usually sufficient to get the depressions 50 above surfaces 24 or at least above where surfaces 24 will be after lapping. After the chromium 20 reaches the necessary thickness on the surfaces of the rings on the arbor, the arbor is removed and placed on a suitable machine where the axially convex surface is formed on the outer face by lapping the surface to a precise 0.0002 inch to 0.0006 inch crown drop.

In accordance with this invention, it has been found that by forming the groove 18, as shown in FIGS. 2 and 3, the depressions 50 in the chromium 20 in FIG. 4, that occur radially opposite to the intersections of the side walls 28 and 30 with the bottom land 19 and with intermediate lands 26 are considerably shallower than similar depressions in rings made in accordance with the prior art. Since there are double the number of intersections between the diverging side walls and the lands in comparison to the grooves in rings found in the prior art, four annular depressions 50 occur in the chromium 20 shown in FIG. 3. However, since the depressions 50 are considerably shallower it is only necessary to build up the thickness of the chromium 20 above the outer bearing shoulders 24 by a distance of about 0.010 inch to provide the finished ring profile shown in FIG. 2. Thus, it can be seen that a considerable savings is made in the amount of chromium that must be used and it takes considerably less time for deposition of the chromium 20 in the groove 18 and on the bearing shoulders 24.

The piston ring of the present invention provides a method of making a ring capable of withstanding the high speed and high powered diesel engines of today. In the foregoing specification, we have set out certain preferred embodiments of our invention; however, it will be understood that this invention may be otherwise embodied within the scope of the following claims.

We claim:

1. A method of making piston rings comprising the steps of:
   (a) forming annular grooves in the outer periphery of a plurality of piston ring blanks to form axially-spaced outer bearing shoulders between said grooves and side faces of said rings, each of said grooves including a bottom land and at least one pair of axially-spaced, radially intermediate lands connected to said bottom land and to said outer bearing shoulders by radially outwardly diverging side walls forming stepped sides for said groove;
   (b) stacking a plurality of said ring blanks on a rotatable arbor;
   (c) electro-depositing a layer of chromium on the outer peripheral surfaces of said ring blanks on said arbor to fill said grooves and cover said bearing shoulders, said electro-depositing resulting in a chromium surface having shallow depressions formed opposite the intermediate and bottom lands, and
   (d) removing an outer portion of said chromium layer to expose said bearing shoulders to form an axially convex outer face on said ring, whereby the stepped sides of the intermediate land minimizes the amount of electro-deposited chromium material required to provide said axially convex outer face on said ring by decreasing the depth of the depressions.

2. The method of claim 1 wherein the axially convex surface is formed by lapping the surface to a precise 0.0002 inch to 0.0006 inch crown drop.

3. The method of claim 2 wherein said intermediate lands are formed substantially midway between said outer bearing faces and said bottom land and the axial width of each of said intermediate lands is at least 0.005 inch.

4. The method of claim 3 wherein said side walls of said groove are formed to diverge radially outwardly at an angle of from 30°–65° relative to the side faces of said ring.

* * * * *